(12) United States Patent
Wang et al.

(10) Patent No.: US 11,949,089 B2
(45) Date of Patent: Apr. 2, 2024

(54) COMPOSITIONS AND METHODS FOR PRELITHIATING ENERGY STORAGE DEVICES

(71) Applicant: Tesla, Inc., Austin, TX (US)

(72) Inventors: Ziying Wang, San Diego, CA (US); Hieu Minh Duong, Rosemead, CA (US)

(73) Assignee: Tesla, Inc., Austin, TX (US)

( * ) Notice: Subject to any disclaimer, the term of this patent is extended or adjusted under 35 U.S.C. 154(b) by 170 days.

(21) Appl. No.: 16/742,021

(22) Filed: Jan. 14, 2020

(65) Prior Publication Data

US 2020/0227723 A1     Jul. 16, 2020

Related U.S. Application Data

(60) Provisional application No. 62/792,544, filed on Jan. 15, 2019.

(51) Int. Cl.
| | |
|---|---|
| *H01M 4/04* | (2006.01) |
| *H01M 4/13* | (2010.01) |
| *H01M 4/139* | (2010.01) |
| *H01M 4/36* | (2006.01) |
| *H01M 4/38* | (2006.01) |
| *H01M 4/62* | (2006.01) |

(Continued)

(52) U.S. Cl.
CPC ....... *H01M 4/0445* (2013.01); *H01M 4/0435* (2013.01); *H01M 4/139* (2013.01); *H01M 4/362* (2013.01); *H01M 4/38* (2013.01); *H01M 4/625* (2013.01); *H01M 10/0525* (2013.01); *H01M 2004/028* (2013.01)

(58) Field of Classification Search
CPC .......... H01M 4/04; H01M 4/62; H01M 4/139; H01M 4/36; H01M 4/38
See application file for complete search history.

(56) References Cited

U.S. PATENT DOCUMENTS

| | | | | |
|---|---|---|---|---|
| 2004/0058246 | A1* | 3/2004 | Choi | H01M 4/366 |
| | | | | 429/231.95 |
| 2007/0132143 | A1* | 6/2007 | Fehrmann | H01M 4/043 |
| | | | | 264/271.1 |

(Continued)

FOREIGN PATENT DOCUMENTS

| | | |
|---|---|---|
| CN | 102569719 | 7/2012 |
| CN | 105655646 | 6/2016 |

(Continued)

OTHER PUBLICATIONS

"Pre-Lithiation Strategies for Rechargeable Energy Storage Technologies: Concepts, Promises and Challenges", Holtstiege et al., Batteries 4, 4. p 1-39, Jan. 23, 2018.*

(Continued)

*Primary Examiner* — Kenneth J Douyette
(74) *Attorney, Agent, or Firm* — Knobbe Martens Olson & Bear, LLP

(57) ABSTRACT

An energy storage device can include a cathode, an anode, and a separator between the cathode and the anode. At least one of the electrodes can include an electrode film prepared by a dry process. The electrode film and/or the electrode can comprise a prelithiating material. Processes and apparatuses used for fabricating the electrode and/or electrode film are also described.

23 Claims, 6 Drawing Sheets

(51) Int. Cl.
    *H01M 10/0525*    (2010.01)
    *H01M 4/02*      (2006.01)

(56) References Cited

U.S. PATENT DOCUMENTS

2017/0256782 A1*  9/2017  Raman ............... H01M 4/0447
2017/0309914 A1* 10/2017  Drews ................ H01M 4/483

FOREIGN PATENT DOCUMENTS

| CN | 106463267    | 2/2017  |
|----|--------------|---------|
| EP | 2 082 407    | 7/2009  |
| JP | 2015-508220  | 3/2015  |
| JP | 2017-517862  | 10/2015 |
| WO | WO 17/183653 | 10/2017 |
| WO | WO 18/217071 | 11/2018 |

OTHER PUBLICATIONS

Agostini et al., Feb. 21, 2014, A lithium-ion sulfer battery based on a carbon-coated lithium-sulfide cathode and an electrodeposited silicon-based anode, ACS Applied Materials & Interfaces, 6(14):10924-10928.

Solchenbach et al., Feb. 8, 2018, Lithium oxalate as capacity and cycle-life enhancer in LNMO/graphite and LNMO/SiG full cells, 165(3):A512-A524.

International Search Report and Written Opinion dated Apr. 24, 2020 in PCT/US2020/013513.

Wood et al., Aug. 29, 2017, Technical and economic analysis of solvent-based lithium-ion electrode drying with water and NMP, Drying Technology, vol. 36, 2018—Issue 2.

* cited by examiner

COMPOSITIONS AND METHODS FOR PRELITHIATING ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional App. No. 62/792,544, filed on Jan. 15, 2019, the entirety of which is hereby incorporated by reference.

BACKGROUND

Field

The present invention relates to energy storage devices, particularly to compositions of and methods for fabricating energy storage device electrodes.

Description of the Related Art

Various types of energy storage devices can be used to power electronic devices, including for example, capacitors, batteries, capacitor-battery hybrids and/or fuel cells. An energy storage device, such as a traditional or solid-state lithium ion capacitor or battery, having an electrode prepared using an improved electrode formulation and/or fabrication process can facilitate improved capacitor electrical performance. A lithium ion capacitor or battery having an electrode prepared using an improved electrode formulation and/or fabrication process may demonstrate improved cycling performance, reduced equivalent series resistance (ESR) values, increased power density performance and/or increased energy density performance. Improved electrode formulations and/or fabrication processes may also facilitate lower costs of energy storage device fabrication.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a dry electrode film of an energy storage device is provided. The dry electrode film includes a dry active material. The dry electrode film further includes a dry binder. The dry electrode further film includes a dry prelithiating material distributed throughout the dry active material and the dry binder. The dry electrode film is free-standing.

In some embodiments of the dry electrode film, the dry prelithiating material is $Li_2O_2$. In some embodiments, the dry active material is a dry cathode active material. In some embodiments, the dry cathode active material comprises sulfur or a material comprising sulfur.

In a second aspect, a method of fabricating a dry electrode film of an energy storage device is provided. The method includes mixing a dry prelithiating material and a dry conductive carbon additive to form a first dry mixture. The method further includes mixing the first dry mixture with a dry active material to form a second dry mixture. The method further includes adding a dry fibrillizable binder to the second dry mixture to form a dry electrode film mixture. The method further includes fibrillizing the dry binder in the dry electrode film mixture.

In some embodiments of the method, the method further comprises calendering the dry electrode film mixture to form a free-standing dry electrode film. In some embodiments, mixing the first dry mixture with the dry active material further comprises mixing a dry carbon material and a dry conductive carbon material to form the second dry mixture. In some embodiments, mixing the dry prelithiating material and the dry conductive carbon additive is performed so that the temperature of the first mixture is at most about 100° C. In some embodiments, mixing the dry prelithiating material and the dry conductive carbon additive results in electrical contact between primary particles of the prelithiating material and the conductive carbon additive. In some embodiments, mixing the dry prelithiating material and the dry conductive carbon additive is performed without excessive heating of the first dry mixture. In some embodiments, the ratio of the dry prelithiating material and the dry conductive carbon additive is about 5:1 to about 5:3.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
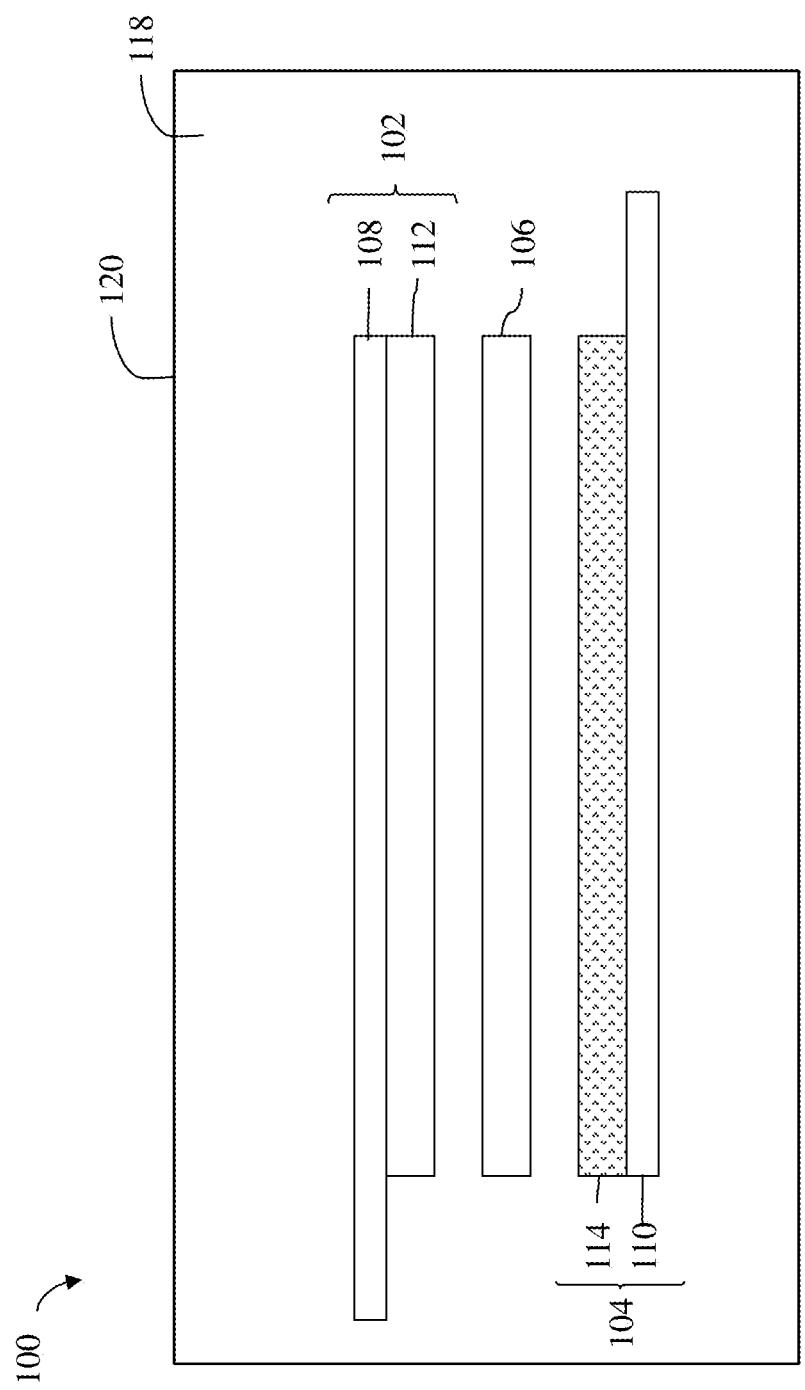
FIG. 1 is a schematic cross-sectional view of a prelithiated energy storage device, according to an embodiment.

The present disclosure is related to electrode films including a prelithiating material, and methods of fabricating thereof, for use in an energy storage device. For example, a prelithiating material may be incorporated into the electrode film to compensate for the lithium consumed in the formation of a solid electrolyte interphase (SEI) layer on the electrode during initial cycling of a corresponding energy storage device. Reaction of the prelithiating material may also produce a gas, which may beneficially increase the porosity of the electrode.

Definitions

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As provided herein, a "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector, support webs or other structures, although supporting elements may be employed to facilitate the energy storage device fabrication processes. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

As provided herein, a "solvent-free" electrode film is an electrode film that contains no detectable processing solvents, processing solvent residues, or processing solvent impurities. A dry electrode film, such as a cathode electrode film or an anode electrode film that is manufactured with only dry components, may be solvent-free.

A "wet" electrode, "wet process" electrode, or slurry electrode, is an electrode or comprises an electrode film prepared by at least one step involving a slurry of active material(s), binder(s), and optionally additive(s), even if a subsequent drying step removes moisture from the electrode or electrode film. Thus, a wet electrode or wet electrode film will include at least one or more processing solvents, processing solvent residues, and/or processing solvent impurities.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In attempts to increase the energy density of lithium ion electrochemical devices, high specific energy density anode materials, such as silicon, are being explored. During the first charge, lithium from the cathode material is consumed during the formation process of a solid electrolyte interphase (SEI) layer, which acts as a protective layer around the anode. However, lithium ions consumed in this formation of the SEI layer are no longer available for cycling during normal operation of the electrochemical devices, resulting in reduced performance potential. Described below is an electrode film composition and formation process that allows the introduction of a prelithiating material into the electrode film mixture used to form a prelithiated electrode film. Some embodiments avoid or reduce decomposing the prelithiating material due to exposure to solvents and high temperatures. Furthermore, in some embodiments, such a prelithiating material may have the added benefit of producing a prelithiated electrode with increased porosity.

FIG. 1 shows a side cross-sectional schematic view of an example of a prelithiated energy storage device 100 with a prelithiated electrode film. The energy storage device 100 may be classified as, for example, a capacitor, a battery, a capacitor-battery hybrid, or a fuel cell. In some embodiments, device 100 is a lithium ion battery.

The device has a first electrode 102, a second electrode 104, and a separator 106 positioned between the first electrode 102 and second electrode 104. The first electrode 102 and the second electrode 104 are adjacent to respective opposing surfaces of the separator 106. The energy storage device 100 includes an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 are housed within an energy storage device housing 120.

One or more of the first electrode 102, the second electrode 104, and the separator 106, or constituent thereof, may comprise porous material. The pores within the porous material can provide containment for and/or increased surface area for contact with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114 with high electrode film densities and/or high electronic densities, respectively. Electrodes 102 and 104 each have a single electrode film 112 and 114 as shown, but other combinations with two or more electrode films for each electrode 102 and 104 are possible. Device 100 is shown with a single electrode 102 and a single electrode 104, but other combinations are possible. Electrode films 112 and 114 can each have any suitable shape, size and thickness. For example, the electrode films can each have a thickness of about 30 microns (μm) to about 250 microns, for example, about, or at least about 50 microns, about 100 microns, about 150 microns, about 200 microns, about 250 microns, about 300 microns, about 400 microns, about 500 microns, about 750 microns, about 1000 microns, about 2000 microns, or any range of values therebetween. Further electrode film thicknesses are described throughout the disclosure, for a single electrode film. The electrode films generally comprise one or more active materials, for example, anode active materials or cathode active materials as provided herein. The electrode films 112 and/or 114 may be dry and/or self-supporting electrode films as provided herein, and having advantageous properties, such as thickness, increased electrode film density, energy density, specific energy density, areal energy density, areal capacity or specific capacity, as provided herein. The first electrode film 112 and/or the second electrode film 114 may also include one or more binders as provided herein. The electrode films 112 and/or 114 may be prepared by a process as described herein. The electrode films 112 and/or 114 may be wet or self-supporting dry electrodes as described herein.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 facilitate electrical coupling between each corresponding electrode film and an external electrical circuit (not shown). The first current collector 108 and/or the second current collector 110 comprise one or more electrically conductive materials, and can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

With continued reference to FIG. 1, the second electrode film 114 is prelithiated. However, it is to be understood that the first electrode film 112 may be prelithiated, or both electrode films 112 and 114 may be prelithiated. Electrode films 112 and/or 114 may be prelithiated as described herein.

In some embodiments, the energy storage device 100 is charged with a suitable lithium-containing electrolyte 118. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(oxalate)borate (LiBOB) and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M, about 0.9 M, about 1 M, about 1.1 M, about 1.2 M, or any range of values therebetween.

In some embodiments, an energy storage device electrolyte as provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, the lithium ion battery is configured to operate at about 2.5 to 4.5 V, or 3.0 to 4.2 V. In further embodiments, the lithium ion battery is configured to have a minimum operating voltage of about 2.5 V to about 3 V, respectively. In still further embodiments, the lithium ion battery is configured to have a maximum operating voltage of about 4.1 V to about 4.4 V, respectively.

In some embodiments, a method for fabricating an energy storage device is provided. In further embodiments, the method comprises selecting an anode and a cathode. In some embodiments, selecting the anode comprises selecting a dry self-supporting anode or a wet anode. In further embodiments, selecting the cathode comprises selecting a dry self-supporting cathode or a wet cathode. The step of selecting a dry anode may comprise selecting an active material processing method, and selecting a binder processing method.

In some embodiments, an electrode film as provided herein includes at least one active material and at least one binder. The at least one active material can be any active material known in the art. The at least one active material may be a material suitable for use in the anode or cathode of a battery. Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multiphase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.).

The cathode active material, can comprise, for example, a metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can comprise, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)) or an olivine (such as $LiFePO_4$). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 6 $mAh/cm^2$. In some embodiments, the cathode film comprising a sulfur or a material including sulfur active material has an electrode film density of 1 $g/cm^3$. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), polyethylene (PE), other thermoplastics, or any combination thereof.

The electrode film can comprise the at least one active material combined with one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be implemented, for example, activated carbon derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In some embodiments, these carbon materials described here can be a different material than the conductive carbon additive and/or the conductive carbon material described in further detail below with respect to the Examples 1 and 2 and the process shown in FIG. 2.

In some embodiments, a cathode electrode film of a lithium ion battery or hybrid energy storage device can include about 70 weight % to about 98 weight % of the at least one active material, including about 70 weight % to about 92 weight %, or about 70 weight % to about 96 weight %. In some embodiments, a cathode electrode film can comprise about or up to about 70 weight %, about or up to about 90 weight %, about or up to about 92 weight %, about 94 weight %, about 95 weight %, about or up to about 96 weight % or about or up to about 98 weight % of the at least one active material, or any range of values therebetween. In some embodiments, a cathode electrode film of a lithium ion battery or hybrid energy storage device can include about 40 weight % to about 60 weight % of the at least one active material. In some embodiments, the cathode electrode film can comprise up to about 10 weight % of the porous carbon material, including up to about 5 weight %, or about 1 weight % to about 5 weight %. In some embodiments, the cathode electrode film can comprise about or up to about 10 weight %, about or up to about 5 weight %, about or up to about 1 weight % or about or up to about 0.5 weight % of the porous carbon material, or any range of values therebetween. In some embodiments, the cathode electrode film comprises up to about 5 weight %, including about 1 weight % to about 3 weight %, of the conductive additive. In some embodiments, the cathode electrode film comprises about or up to about 10 weight %, 5 weight %, about or up to about 3 weight % or about or up to about 1 weight % of the conductive additive, or any range of values therebetween. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder. In some embodiments, the cathode electrode film comprises about or up to about 20 weight %, about or up to about 15 weight %, about or up to about 10 weight %, about or up to about 5 weight %, about or up to about 3 weight %, about or up to about 1.5 weight % or about or up to about 1 weight % of the binder, or any range of values therebetween.

In some embodiments, an anode electrode film may comprise at least one active material, a binder, and optionally a conductive additive and/or a conductive material. In some embodiments, the conductive additive may comprise a conductive carbon additive, such as a carbon black. In some embodiments, the conductive material may comprise a conductive carbon material, such as a carbon black. In some embodiments, the conductive carbon additive is a different type and/or amount of material to the conductive carbon material. For example, in some embodiments, the conductive carbon additive and the conductive carbon material are different carbon black materials. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the at least one active material, including about 80 weight % to about 98 weight %, or about 94 weight % to about 97 weight %. In some embodiments, an anode electrode film can include about 80 weight %, about 85 weight %, about 90 weight %, about 92 weight %, about 94 weight %, about 95 weight %, about 96 weight %, about 97 weight % or about 98 weight % or about 99 weight % of the at least one active material, or any range of values therebetween. In some embodiments, the anode electrode film comprises up to about 5 weight %, including about 1 weight % to about 3 weight %, of the conductive additive. In some embodiments, the anode electrode film comprises about or up to about 5 weight %, about or up to about 3 weight %, about or up to about 1 weight % or about or up to about 0.5 weight % of the conductive additive, or any range of values therebetween. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode electrode film comprises about or up to about 20 weight %, about or up to about 15 weight %, about or up to about 10 weight %, about or up to about 5 weight %, about or up to about 3 weight %, about or up to about 1.5 weight % or about or up to about 1 weight % of the binder, or any range of values therebetween. In some embodiments, the anode film may not include a conductive additive.

Some embodiments include an electrode film, such as of an anode and/or a cathode, having one or more active layers comprising a polymeric binder material. The binder can include polytetrafluoroethylene (PTFE), a polyolefin, polyalkylenes, polyethers, styrene-butadiene, co-polymers of polysiloxanes and polysiloxane, branched polyethers, polyvinylethers, co-polymers thereof, and/or admixtures thereof. The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder may be a thermoplastic. In some embodiments, the binder comprises a fibrillizable polymer. In certain embodiments, the binder comprises, consists essentially, or consists of a single fibrillizable binder, such as PTFE.

In some embodiments, the binder may comprise PTFE and optionally one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. An admixture of polymers may comprise interpenetrating networks of the aforementioned polymers or co-polymers.

The binder may include various suitable ratios of the polymeric components. For example, PTFE can be up to about 98 weight % of the binder, for example, from about 20 weight % to about 95 weight %, about 20 weight % to about 90 weight %, including about 20 weight % to about 80 weight %, about 30 weight % to about 70 weight %, about 30 weight % to about 50 weight %, or about 50 weight % to about 90 weight %. In some embodiments, PTFE can be about or up to about 99 weight %, about or up to about 98 weight %, about or up to about 95 weight %, about or up to about 90 weight %, about or up to about 80 weight %, about or up to about 70 weight %, about or up to about 60 weight %, about or up to about 50 weight %, about or up to about 40 weight %, about or up to about 30 weight % or about or up to about 20 weight % of the binder, or any range of values therebetween.

In some embodiments, the electrode film mixture may include binder particles having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 µm, about 2 µm, about 3 µm, about 4 µm, about 5 µm, about 10 µm, about 50 µm, about 100 µm, or any range of values therebetween.

As used herein, a dry electrode fabrication process can refer to a process in which no or substantially no solvents are used to form a dry electrode film. For example, components of the active layer or electrode film, including carbon materials and binders, may comprise, consist of, or consist essentially of dry particles. The dry particles for forming the active layer or electrode film may be combined to provide a dry particle active layer mixture. In some embodiments, the active layer or electrode film may be formed from the dry particle active layer mixture such that weight percentages of the components of the active layer or electrode film and weight percentages of the components of the dry particles active layer mixture are substantially the same. In some embodiments, the active layer or electrode film formed from the dry particle active layer mixture using the dry fabrication process may be free from, or substantially free from, any processing additives such as solvents and solvent residues resulting therefrom. In some embodiments, the resulting active layer or electrode films are self-supporting films formed using the dry process from the dry particle mixture. In some embodiments, the resulting active layer or electrode films are free-standing films formed using the dry process from the dry particle mixture. A process for forming an active layer or electrode film can include fibrillizing the fibrillizable binder component(s) such that the film comprises fibrillized binder. In further embodiments, a free-standing active layer or electrode film may be formed in the absence of a current collector. In still further embodiments, an active layer or electrode film may comprise a fibrillized polymer matrix such that the film is self-supporting. It is thought that a matrix, lattice, or web of fibrils can be formed to provide mechanical structure to the electrode film.

In some embodiments, an energy storage device electrode film, wherein the electrode film is dry and/or self-supporting film, may provide a high electrode material loading, or a high active material loading (which may be expressed as mass of electrode film per unit area of electrode film or current collector) of about 12 mg/cm$^2$, about 13 mg/cm$^2$, about 14 mg/cm$^2$, about 15 mg/cm$^2$, about 16 mg/cm$^2$, about 17 mg/cm$^2$, about 18 mg/cm$^2$, about 19 mg/cm$^2$, about 20 mg/cm$^2$, about 21 mg/cm$^2$, about 22 mg/cm$^2$, about 23 mg/cm$^2$, about 24 mg/cm$^2$, about 25 mg/cm$^2$, about 26 mg/cm$^2$, about 27 mg/cm$^2$, about 28 mg/cm$^2$, about 29 mg/cm$^2$, about 30 mg/cm$^2$, about 40 mg/cm$^2$, about 50 mg/cm$^2$, about 60 mg/cm$^2$, about 70 mg/cm$^2$, about 80 mg/cm$^2$, about 90 mg/cm$^2$ or about 100 mg/cm$^2$, or any range of values therebetween. In some embodiments, an energy storage device electrode film, wherein the electrode film is dry and/or self-supporting film, may provide a high electrode material loading, or a high active material loading (which may be expressed as mass of electrode film per unit area of electrode film or current collector) of at least about 12 mg/cm$^2$, at least about 13 mg/cm$^2$, at least about 14 mg/cm$^2$, at least about 15 mg/cm$^2$, at least about 16 mg/cm$^2$, at least about 17 mg/cm$^2$, at least about 18 mg/cm$^2$, at least about 19 mg/cm$^2$, at least about 20 mg/cm$^2$, at least about 21 mg/cm$^2$, at least about 22 mg/cm$^2$, at least about 23 mg/cm$^2$, at least about 24 mg/cm$^2$, at least about 25 mg/cm$^2$, at least about 26 mg/cm$^2$, at least about 27 mg/cm$^2$, at least about 28 mg/cm², at least about 29 mg/cm², at least about 30 mg/cm², at least about 40 mg/cm², at least about 50 mg/cm², at least about 60 mg/cm², at least about 70 mg/cm², at least about 80 mg/cm², at least about 90 mg/cm² or at least about 100 mg/cm², or any range of values therebetween.

An electrode film may have a selected thickness suitable for certain applications. The thickness of an electrode film as provided herein may be greater than that of an electrode film prepared by conventional processes. In some embodiments, the electrode film can have a thickness of about, or greater than about, 110 microns, about 115 microns, about 120 microns, about 130 microns, about 135 microns, about 150 microns, about 155 microns, about 160 microns, about 170 microns, about 200 microns, about 250 microns, about 260 microns, about 265 microns, about 270 microns, about 280 microns, about 290 microns, about 300 microns, about 350 microns, about 400 microns, about 450 microns, about 500 microns, about 750 microns, about 1 mm, or about 2 mm, or any range of values therebetween. An electrode film thickness can be selected to correspond to a desired areal capacity, specific capacity, areal energy density, energy density, or specific energy density.

In some embodiments, the electrode film porosity of an electrode film as provided herein may be greater than that of an electrode film prepared by conventional processes. In some embodiments, the electrode film porosity of an electrode film as provided herein may be less than that of an electrode film prepared by conventional processes. In some embodiments, the electrode film can have an electrode film porosity (which may be expressed as the percentage of volume of electrode film occupied by pores) of about 10%, about 12%, about 14%, about 16%, about 18% or about 20%, or any range of values therebetween. In some embodiments, the electrode film can have an electrode film porosity (which may be expressed as the percentage of volume of electrode film occupied by pores) of at least about 10%, at least about 12%, at least about 14%, at least about 16%, at least about 18% or at least about 20%, or any range of values therebetween. In some embodiments, the electrode film can have an electrode film porosity (which may be expressed as the percentage of volume of electrode film occupied by pores) of at most about 10%, at most about 12%, at most about 14%, at most about 16%, at most about 18% or at most about 20%, or any range of values therebetween.

In some embodiments, the electrode film density of an electrode film as provided herein may be less than that of an electrode film prepared by conventional processes. In some embodiments, the electrode film density of an electrode film as provided herein may be greater than that of an electrode film prepared by conventional processes. In some embodiments, the electrode film can have an electrode film density of about 0.8 g/cm³, 1.0 g/cm³, 1.4 g/cm³, about 1.5 g/cm³, about 1.6 g/cm³, about 1.7 g/cm³, about 1.8 g/cm³, about 1.9 g/cm³, about 2.0 g/cm³, about 2.5 g/cm³, about 3.0 g/cm³, about 3.3 g/cm³, about 3.4 g/cm³, about 3.5 g/cm³, about 3.6 g/cm³, about 3.7 g/cm³ or about 3.8 g/cm³, or any range of values therebetween. In some embodiments, the electrode film can have an electrode film density of at most about 0.8 g/cm³, 1.0 g/cm³, 1.4 g/cm³, at most about 1.5 g/cm³, at most about 1.6 g/cm³, at most about 1.7 g/cm³, at most about 1.8 g/cm³, at most about 1.9 g/cm³ or at most about 2.0 g/cm³, or any range of values therebetween. In some embodiments, the electrode film can have density of at least about 0.8 g/cm³, 1.0 g/cm³, 1.4 g/cm³, at least about 1.5 g/cm³, at least about 1.6 g/cm³, at least about 1.7 g/cm³, at least about 1.8 g/cm³, at least about 1.9 g/cm³, at least about 2.0 g/cm³, at least about 2.5 g/cm³, at least about 3.0 g/cm³, at least about 3.3 g/cm³, at least about 3.4 g/cm³ or at least about 3.5 g/cm³, or any range of values therebetween.

In some embodiments, an energy storage device electrode film, wherein the electrode film is dry and/or self-supporting film, may provide areal capacity (which may be expressed as capacity per unit area of electrode film or current collector) of about, or at least about 3.5 mAh/cm², about 3.8 mAh/cm², about 4 mAh/cm², about 4.3 mAh/cm², about 4.5 mAh/cm², about 4.8 mAh/cm², about 5 mAh/cm², about 5.5 mAh/cm², about 6 mAh/cm², about 6.5 mAh/cm², about 6.6 mAh/cm², about 7 mAh/cm², about 7.5 mAh/cm², about 8 mAh/cm² or about 10 mAh/cm², or any range of values therebetween. In further embodiments, an energy storage device electrode film, wherein the electrode film is dry and/or self-supporting film, may provide areal capacity (which may be expressed as capacity per unit area of electrode film or current collector) of at least about 8 mAh/cm², for example, about 8 mAh/cm², about 10 mAh/cm², about 12 mAh/cm², about 14 mAh/cm², about 16 mAh/cm², about 18 mAh/cm², about 20 mAh/cm², or any range of values therebetween. In some embodiments, the areal capacity is charging capacity. In further embodiments, the areal capacity is discharging capacity.

In some embodiments, a dry and/or self-supporting graphite battery anode electrode film may provide areal capacity of about 3.5 mAh/cm², about 4 mAh/cm², about 4.5 mAh/cm², about 5 mAh/cm², about 5.5 mAh/cm², about 6 mAh/cm², about 6.5 mAh/cm², about 7 mAh/cm², about 7.5 mAh/cm², about 8 mAh/cm², about 8.5 mAh/cm², about 9 mAh/cm², about 10 mAh/cm², or any range of values therebetween. In some embodiments, the areal capacity is charging capacity. In further embodiments, the areal capacity is discharging capacity.

In some embodiments, an energy storage device electrode film, wherein the electrode film is dry and/or self-supporting film, may provide a specific capacity (which may be expressed as capacity per mass of electrode film or current collector) of about 150 mAh/g, about 160 mAh/g, about 170 mAh/g, about 175 mAh/g, about 176 mAh/g, about 177 mAh/g, about 179 mAh/g, about 180 mAh/g, about 185 mAh/g, about 190 mAh/g, about 196 mAh/g, about 200 mAh/g, about 250 mAh/g, about 300 mAh/g, about 350 mAh/g, about 354 mAh/g or about 400 mAh/g, or any range of values therebetween. In further embodiments, an energy storage device electrode film, wherein the electrode film is dry and/or self-supporting film, may provide specific capacity (which may be expressed as capacity per mass of electrode film or current collector) of at least about 175 mAh/g or at least about 250 mAh/g, or any range of values therebetween. In some embodiments, the specific capacity is charging capacity. In further embodiments, the specific capacity is discharging capacity. In some embodiments, the electrode may be an anode and/or a cathode. In some embodiment, the specific capacity may be a first charge and/or discharge capacity. In further embodiments, the specific capacity may be a charge and/or discharge capacity measured after the first charge and/or discharge.

In some embodiments, a self-supporting dry electrode film described herein may advantageously exhibit improved performance relative to a typical electrode film. The performance may be, for example, tensile strength, elasticity (extension), bendability, coulombic efficiency, capacity, or conductivity. In some embodiments, an energy storage device electrode film, wherein the electrode film is dry and/or self-supporting film, may provide a coulombic efficiency (which may be expressed as a percent of the discharge capacity divided by the charge capacity) of about, or at least about, 85%, 86%, 87%, about 88%, about 89%, about 90%, about 91%, about 92%, about 93%, about 94% or about 95%, or any range of values therebetween for example such as 90.1%, 90.5% and 91.9%, or any range of values therebetween.

In some embodiments, an energy storage device electrode film or electrode, wherein the electrode film is or the electrode comprises a dry and/or self-supporting film, may provide a charge capacity retention percentage (which may be expressed by the discharge capacity at a given rate divided by the discharge capacity measured at C/10) of about or at least about 10%, about or at least about 20%, about or at least about 30%, about or at least about 40%, about or at least about 50%, about or at least about 60%, about or at least about 70%, about or at least about 80%, about or at least about 90%, about or at least about 98%, about or at least about 99%, about or at least about 99.9% or about or at least about 100%, or any range of values therebetween. In some embodiments, the discharge rate of the charge capacity retention percentage is about or is at least about C/10, C/5, C/3, C/2, 1C, 1.5C or 2C, or any value therebetween.

In some embodiments, an energy storage device electrode film or electrode, wherein the electrode film is or the electrode comprises a dry and/or self-supporting film, may provide a charge capacity production percentage (which may be expressed by the charge capacity measured at a given constant current rate divided by the discharge capacity measured at C/10) of about or at least about 10%, about or at least about 20%, about or at least about, 30%, about or at least about, 40%, about or at least about 50% about or at least about 60%, about or at least about 70%, about or at least about 80%, about or at least about 90%, about or at least about 98%, about or at least about 99%, about or at least about 99.9% or about or at least about 100%, or any range of values therebetween. In some embodiments, the charge rate of the charge capacity production percentage is or is at least C/10, C/5, C/3, C/2, 1C, 1.5C or 2C, or any value therebetween.

In some embodiments, an energy storage device electrode film, wherein the electrode film is dry and/or self-supporting film, may provide a specific energy density or gravimetric energy density (which may be expressed as energy per mass of electrode film) of about 200 Wh/kg, about 210 Wh/kg, about 220 Wh/kg, about 230 Wh/kg, about 240 Wh/kg, about 250 Wh/kg, about 260 Wh/kg, about 270 Wh/kg, about 280 Wh/kg, about 290 Wh/kg, about 300 Wh/kg, about 400 Wh/kg, about 500 Wh/kg, about 600 Wh/kg, about 650 Wh/kg, about 700 Wh/kg, about 750 Wh/kg, about 800 Wh/kg, about 825 Wh/kg, about 850 Wh/kg or about 900 Wh/kg, or any range of values therebetween.

In some embodiments, an energy storage device electrode film, wherein the electrode film is dry and/or self-supporting film, may provide an energy density or volumetric energy density (which may be expressed as energy per unit volume of the final or in situ electrode film) of about 550 Wh/L, about 600 Wh/L, about 630 Wh/L, about 650 Wh/L, about 680 Wh/L, about 700 Wh/L, about 750 Wh/L, about 850 Wh/L, about 950 Wh/L, about 1100 Wh/L, about 1400 Wh/L, about 1425 Wh/L, about 1450 Wh/L, about 1475 Wh/L, about 1500 Wh/L, about 1525 Wh/L or about 1550 Wh/L, or any range of values therebetween.

In some embodiments, a self-supporting dry battery cathode may exhibit reduced ohmic resistance and/or improved voltage polarization characteristics compared to a wet battery cathode. In further embodiments, a lithium ion battery incorporating a self-supporting dry cathode may advantageously exhibit reduced ohmic resistance and/or improved voltage polarization characteristics compared to a lithium ion battery having a wet cathode and a wet anode. In still further embodiments, a lithium ion battery incorporating a self-supporting dry cathode may demonstrate improved energy density and/or specific energy density, as compared to a lithium ion battery including a wet cathode.

In some embodiments, a self-supporting dry battery electrode after aging may exhibit reduced ohmic resistance, improved voltage polarization characteristics and/or improved capacity compared to an aged wet battery electrode. In some embodiments, the dry battery electrode after aging exhibits a reduction of ohmic resistance that is about 5 fold, about 10 fold, about 15 fold or about 20 fold less than the reduction of ohmic resistance in a similarly aged wet battery electrode, or any range of values therebetween. In some embodiments, the dry battery electrode after aging exhibits reduction of voltage of about 1.5 times, about 2 times, about 3 times or about 5 times less than the reduction of voltage in a similarly aged wet battery electrode, or any range of values therebetween. In some embodiments, the dry battery electrode after aging exhibits reduction of capacity of about 1.5 times, about 2 times, about 3 times or about 5 times less than the reduction of capacity in a similarly aged wet battery electrode, or any range of values therebetween.

Prelithiation:

Prelithiation of an electrode may enable compensation of lithium consumed during initial cycling of the electrochemical device, which are no longer available for subsequent cycling. A sacrificial prelithiating material may be incorporated into the electrode in order to compensate for the lithium consumed, for example, in the formation of a solid electrolyte interphase (SEI) layer on the anode during initial cycling.

A prelithiating material as defined herein is a material comprising a lithium that is oxidized when the electrochemical device is cycled to form free lithium ions and a byproduct. The lithium ions are then able to be solvated by the electrolyte of the device. As such, the prelithiating material acts as a source of lithium from within an electrode film, and compensates for the lithium ions consumed during the first charge process of an electrochemical device. In some embodiments, the prelithiating material is a strong reducing agent. In some embodiments the prelithiating material is a lithium oxide. In some embodiments, the prelithiating material is lithia ($Li_2O$), lithium peroxide ($Li_2O_2$), $Li_2S$, $Li_3N$, $LiN_3$, LiF, $Li_5FeO_4$, $Li_2NiO_2$, $Li_6CO_4$, $Li_2MoO_3$, or mixtures thereof. In some embodiments, the prelithiating material is $Li_2O_2$. It will be understood that the prelithiating material does not include elemental lithium metal, which is lithium metal having an oxidation state of zero.

Reaction of the prelithiating material may also produce a beneficial byproduct in addition to the lithiating an electrode. In some embodiments, the by-product may be a gas. For example, decomposition of lithium peroxide produces oxygen gas. The production of a gas from the prelithiating material within the electrode may beneficially increase the porosity of the electrode.

In some embodiments, an electrode film mixture may comprise the prelithiating material in, or in about, 0.5 wt %, about 1 wt %, about 1.5 wt %, about 2 wt %, about 3 wt %, about 4 wt %, about 5 wt %, about 6 wt %, about 7 wt %, about 8 wt %, about 9 wt % or about 10 wt %, or any range of values therebetween.

Figure 2:
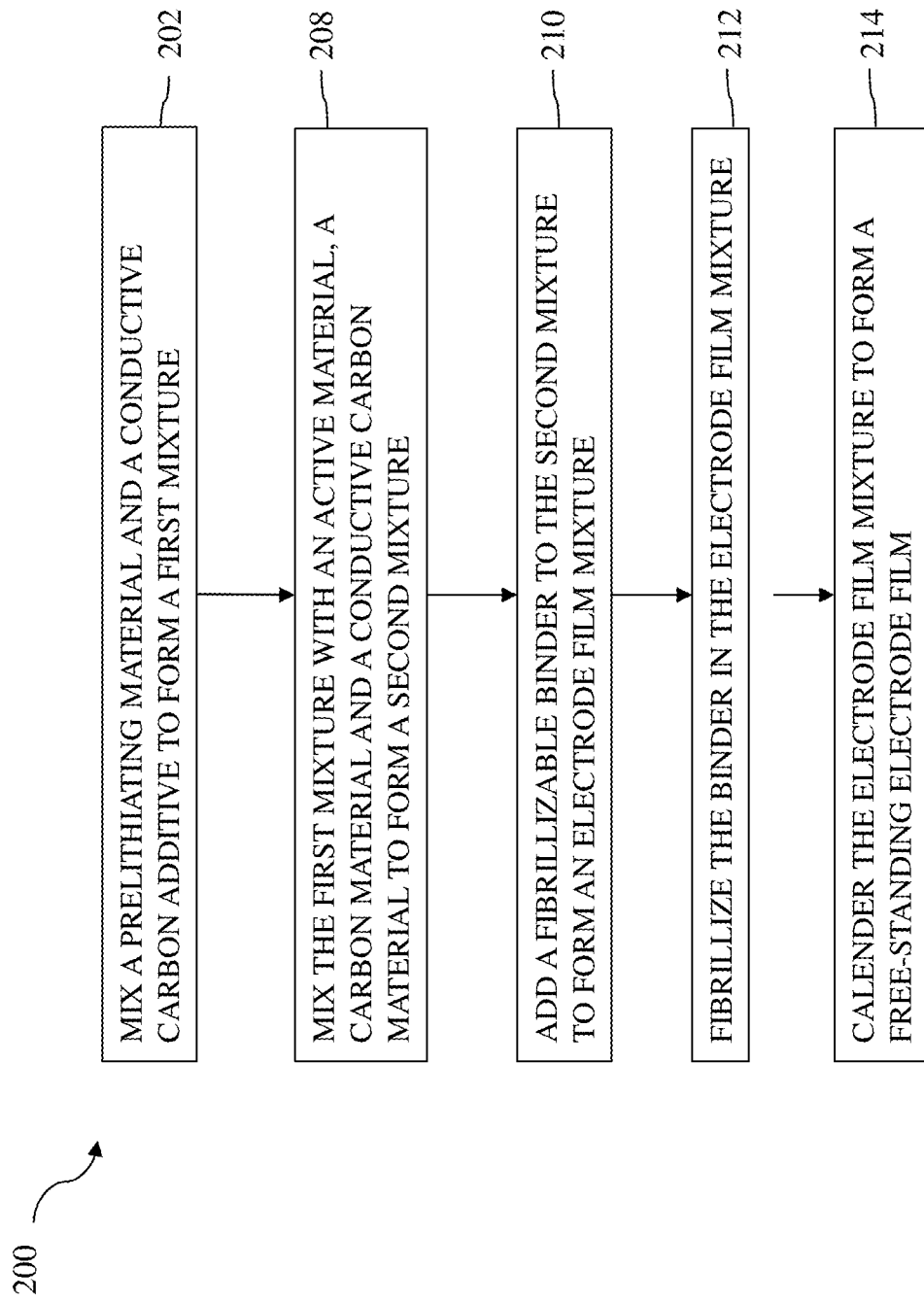
FIG. 2 is a process flow diagram showing an example of a process for fabricating an electrode film from an electrode film mixture comprising a prelithiating material.

FIG. 2 is a process flow diagram showing an example of a process 200 for fabricating an electrode film comprising a prelithiating material, according to some embodiments. In block 202, a first mixture comprising a prelithiating material and a conductive carbon additive is formed through a mixing step. In some embodiments, the prelithiating material is lithium peroxide. In some embodiments, the conductive carbon additive is carbon black, as described herein. In some embodiments, the mixing shown in block 202 is performed without excessive heating of the first mixture. In some embodiments, the mixing shown in block 202 is performed so that the temperature of the first mixture is at most or at most about 200° C., 150° C., 140° C., 130° C., 120° C., 110° C., 100° C., 90° C., 80° C., 70° C., 60° C. or 50° C., or any range of values therebetween. In some embodiments, the mixing shown in block 202 is performed so that the temperature of the first mixture is below or below about 200° C., 150° C., 140° C., 130° C., 120° C., 110° C., 100° C., 90° C., 80° C., 70° C., 60° C. or 50° C., or any range of values therebetween. In some embodiments, the mixing shown in block 202 is performed by blending. In some embodiments, the weight ratio of the prelithiating material to the conductive carbon additive is about 10:1, about 5:1, about 5:2, about 5:3, about 5:4 or about 1:1, or any range of values therebetween. In some embodiments, the prelithiating material and conductive carbon additive are intimately mixed so as to evenly distribute the components throughout the first mixture. In some embodiments, the prelithiating material and conductive carbon additive are mixed so as to result in electrical contact between primary particles of the prelithiating material and conductive carbon additive.

In block 208, the first mixture of block 202 is mixed with an active material, a carbon material and a conductive carbon material to form a second mixture. In some embodiments, the active material, carbon material and conductive carbon material are first mixed to form an additional mixture, prior to being mixed with the first mixture of block 202. In some embodiments, the conductive carbon material is carbon black, as described herein. In some embodiments, the carbon material and/or the conductive carbon material are not utilized in block 208 to form the second mixture. In some embodiments, the mixing shown in block 208 is performed by blending. In some embodiments, the mixing shown in block 208 is performed so that the temperature of the first mixture is at most or at most about 200° C., 150° C., 140° C., 130° C., 120° C., 110° C., 100° C., 90° C., 80° C., 70° C., 60° C. or 50° C., or any range of values therebetween. In some embodiments, the mixing shown in block 208 is performed so that the temperature of the first mixture is below or below about 200° C., 150° C., 140° C., 130° C., 120° C., 110° C., 100° C., 90° C., 80° C., 70° C., 60° C. or 50° C., or any range of values therebetween. In some embodiments, the first mixture, active material, carbon material and a conductive carbon material are intimately mixed so as to evenly distribute the components throughout the second mixture. In some embodiments, the mixing process of block 208 is utilized to break or modify particles of the active material. In some embodiments, modified particles of the active material act to catalyze the reaction of the prelithiating material during initial cycling of the electrochemical device.

In some embodiments, the mixing steps of blocks 202 and 208 may utilize a continuous mixing process. In such embodiments, the duration of blending and/or milling can be inversely related to the feed rate. Generally, the feed rate is dependent on the milling machinery, and can be adjusted based on the machine operating parameters in view of guidance provided herein. In further embodiments, equipment with larger channels can be used to increase the duration of blending and/or milling. When a batch blending and/or milling process is used, the duration can be increased simply by blending and/or milling for a longer time and/or at higher RPMs.

In block 210, an electrode film mixture is formed by adding a fibrillizable binder to the second mixture of block 208. In some embodiments, the fibrillizable binder and the second mixture can be intimately mixed so as to evenly distribute the components throughout the electrode film mixture. In block 212, the fibrillizable binder in electrode film mixture can be fibrillized to form fibrils from the binder material. The fibrillization process can be performed with reduced speed and/or increased process pressure. The reduced speed and/or increased process pressure may facilitate increased formation of fibrils such that a reduced quantity of binder material can be used to form the electrode film having the desired resistance to a tensile, shear, compressive, and/or twisting stress. As described herein, in some embodiments, the fibrillization process can be a mechanical shearing process, for example, comprising a blending and/or a milling process, and in some embodiments, a high shear process such as jet milling. In some embodiments, the speed with which particles of the electrode film mixture are cycled through the blender and/or mill may be reduced during the fibrillization process. In some embodiments, the process pressure within the blender and/or mill during the fibrillization process may be increased. In some embodiments, the adding step of block 210 and fibrillization step of block 212 may be one or substantially one continuous step. The reduced speed and/or increased process pressure can allow an electrode film with a sufficiently great strength to be manufactured, for example such as a free-standing electrode film, either through a single, higher pressure calendering process (in a single step), or through multiple calendering steps, for example, where the film is unwound, and subsequently re-calendered, one or more times after an initial calendering step.

In block 214, the electrode film mixture can be calendered in a calender apparatus to form a free-standing fibrillized electrode film. A calender apparatus is well known in the art, and generally includes a pair of calender rolls (possessing either mechanically fixed gap or a hydraulic or pneumatic pressure fixed gap) between which raw material, such as an electrode film mixture is fed, to form an electrode film. In some embodiments, an electrode film can be formed in a first calendering step, without additional calendering steps, to form a film at a desired minimum thickness, as described further herein. In some embodiments, the calendered mixture forms a free-standing dry particle film free or substantially free from any liquids, solvents, and resulting residue therefrom. In some embodiments, the electrode film is an anode electrode film. In some embodiments, the electrode film is a cathode electrode film.

In some embodiments, the process 200 for fabricating an electrode film is a dry process, where no liquids or solvents are used and the listed raw materials are dry (e.g. one or more are dry powders) such that the resulting electrode film is free or substantially free of any liquids, solvents, and resulting residues. In other wet electrode film processes, prelithiating materials may react with solvents, for example PVDF and N-Methyl-2-pyrrolidone (NMP), which may produce side products that could negatively impact the performance of the energy storage device. As such, a dry electrode process may offer a unique method to incorporate prelithiating material into an electrode film without exposure to solvents. Furthermore, polytetrafluoroethylene (PTFE)

may be advantageously utilized as it is resistant to some acceptable prelithiating materials, for example lithium peroxide.

In specific examples below, high energy density, high specific energy density, high thickness and/or high electrode film density battery electrodes were fabricated.

EXAMPLES

Example 1

Figure 3A:
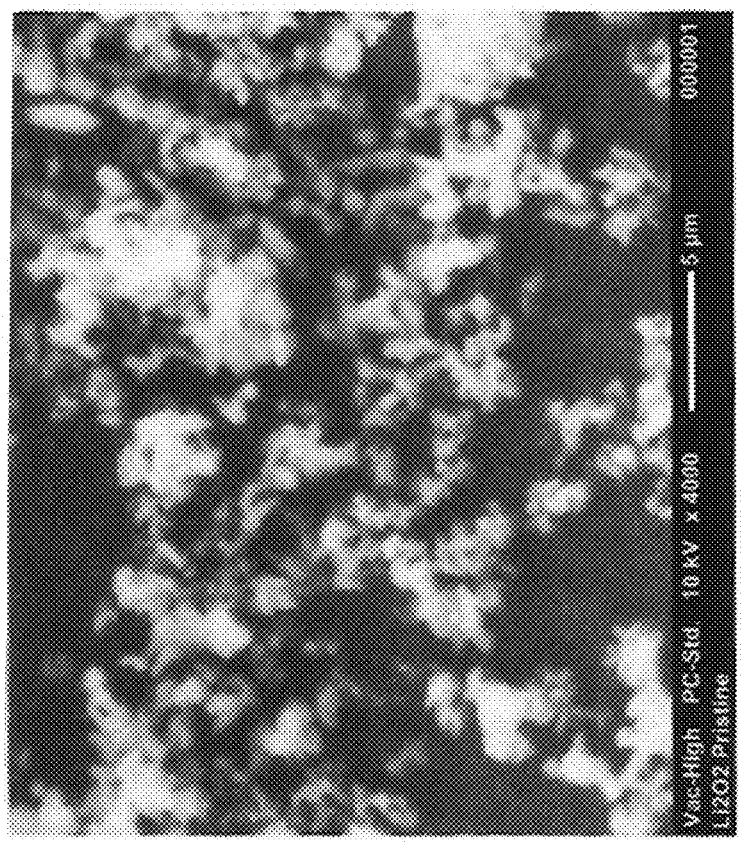
FIG. 3A shows an SEM image of the lithium peroxide as received.
Figure 3B:
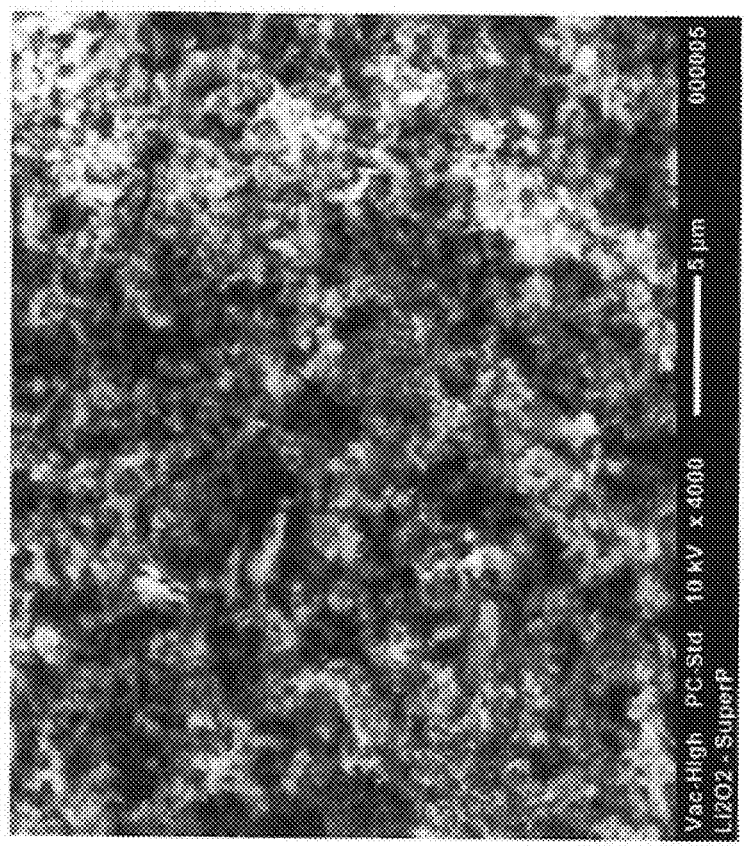
FIG. 3B shows an SEM image of the lithium peroxide mixed with the SuperP carbon black at a 5 to 2 ratio.

Example 1 describes an electrode film formed according to the process described in FIG. 2. Lithium peroxide is mixed with SuperP carbon black at a 5 to 2 ratio in a Waring blender for 10 minutes on low setting in an Argon glovebox. FIG. 3A shows an SEM image of the lithium peroxide, which demonstrates submicron primary particles. FIG. 3B shows an SEM image of the lithium peroxide mixed with the SuperP carbon black at a 5 to 2 ratio, which demonstrates intimate mixing and uniform distribution of both components. As described with reference to FIG. 2, this first dry mixture was mixed to ensure dispersion of lithium peroxide with the electrical conductive carbon black, wherein the lithium peroxide and SuperP were blended with intermittent 30 second pulses at 3000 rpm with 30 seconds of cooling in between. The aforementioned blending limited the temperature of the lithium peroxide and SuperP mixture to below about 100° C. in order to avoid excessive heating of the mixture during blending.

A pre-densified mixture of cathode active material NMC-622, activated carbon, and ketjen black was formed, to which the lithium peroxide/SuperP mixture was then added to and blended with in the Argon glovebox on low setting for 5 minutes. Blending was performed in part to breaks up a small fraction of the cathode active material secondary particles, so as to cause the smaller primary particles to act as catalysts for the oxygen evolution reaction of lithium peroxide during the initial cycling of an electrochemical device. Finally, a PTFE binder was added to the mixture, and the binder was fibrillized to form an electrode film mixture.

Calendaring of the electrode film mixture was performed in a dry room to minimize powder exposure to moisture to form a free-standing electrode film. The free-standing electrode film is then further calendared to the desired loading and laminated onto an aluminum foil with an adhesive coating to form a cathode electrode.

Figure 4:
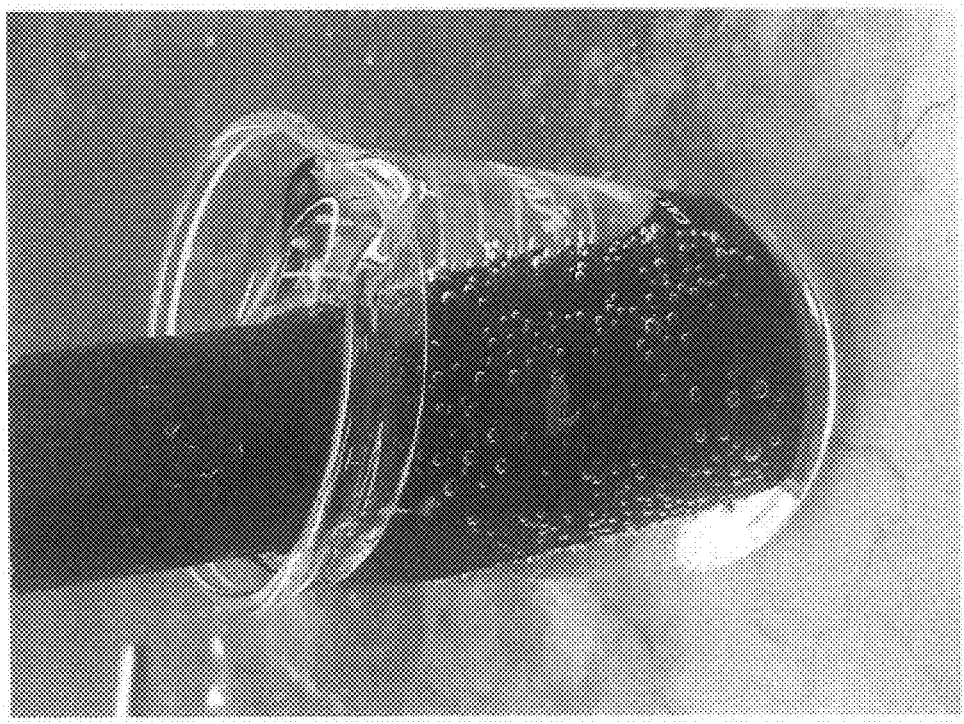
FIG. 4 shows an image of a laminated electrode comprising lithium peroxide submerged in water.

FIG. 4 shows an image of such a laminated electrode submerged in water. In FIG. 4 the evolution of oxygen gas bubbles can be seen on the surface of the laminated electrode, which indicates that the lithium peroxide present in the electrode is still active and has not decomposed. The reaction of lithium peroxide and water follows the chemical equation:

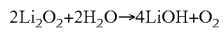

$$2Li_2O_2 + 2H_2O \rightarrow 4LiOH + O_2$$

Example 2

Figure 5:
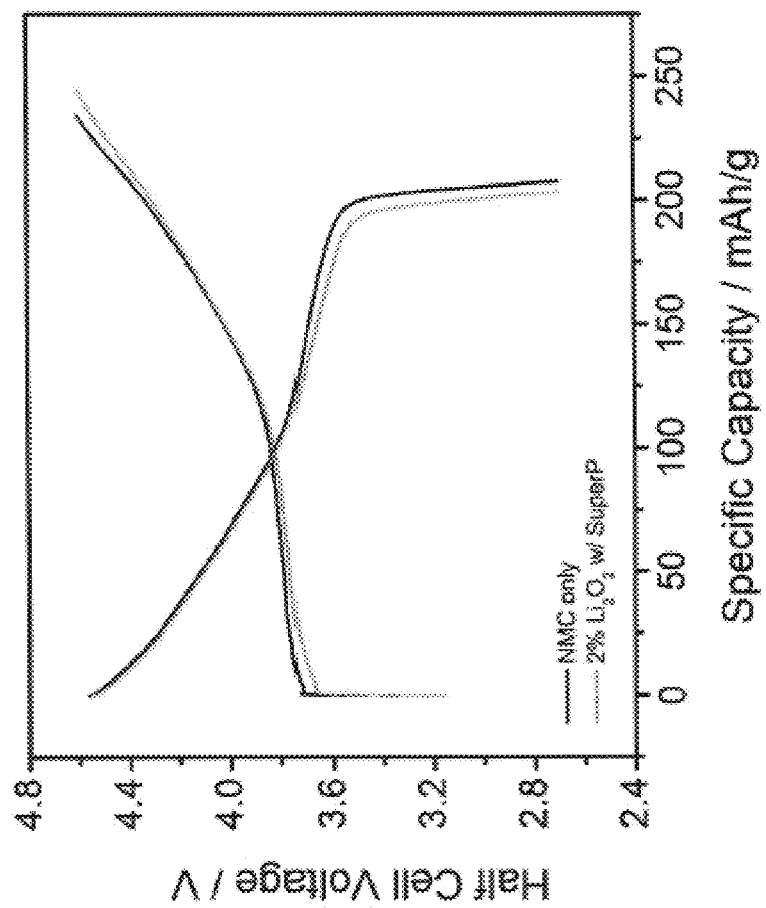
FIG. 5 compares the electrochemical profiles of an electrochemical cell comprising 2% lithium peroxide compared to and control cell without lithium peroxide.

FIG. 5 shows the electrochemical profiles of a 2% lithium peroxide cell produced in Example 1, and control cell without lithium peroxide. The electrochemical cycling of lithium peroxide containing lithium ion cathode electrode shows increased initial charge capacity due to electrochemical release of oxygen from lithium peroxide and an increase in charge capacity of approximately 10 mAh/g is observed when 2% lithium peroxide is added, which accounts to about 45% of the theoretical 22 mAh/g if all lithium peroxide is utilized. This extra charge capacity may be used to compensate for irreversible capacity of the anode during formation cycles.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

The headings provided herein, if any, are for convenience only and do not necessarily affect the scope or meaning of the devices and methods disclosed herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A dry electrode film of an energy storage device, comprising:
   a dry active material;
   a dry binder; and
   a dry prelithiating material distributed throughout the dry active material and the dry binder, wherein the dry prelithiating material does not comprise elemental lithium metal;
   wherein the dry electrode film is free-standing and is substantially free of solvent residues, and
   wherein the dry prelithiating material comprises about 0.5-10 wt. % of the dry electrode film.

2. The dry electrode film of claim 1, wherein the dry prelithiating material is selected from the group consisting of $Li_2O$, $Li_2O_2$, $Li_2S$, $Li_3N$, $LiN_3$, $LiF$, $Li_5FeO_4$, $Li_2NiO_2$, $Li_6CoO_4$, and $Li_2MoO_3$, or combinations thereof.

3. The dry electrode film of claim 1, wherein the dry prelithiating material is $Li_2O_2$.

4. The dry electrode film of claim 1, wherein the dry prelithiating material comprises about 1-3 wt. % of the dry electrode film.

5. The dry electrode film of claim 1, wherein the dry active material is a dry cathode active material.

6. The dry electrode film of claim 5, wherein the dry cathode active material comprises sulfur or a material comprising sulfur.

7. An energy storage device comprising the dry electrode film of claim 1.

8. The energy storage device of claim 7, wherein the energy storage device is a battery.

9. The dry electrode film of claim 1, further comprising a dry conductive carbon additive, wherein a weight ratio of the dry prelithiating material and the dry conductive carbon additive is within a range of about 10:1 to about 1:1.

10. The dry electrode film of claim 1, wherein the dry prelithiating material comprises submicron sized particles.

11. The dry electrode film of claim 1, wherein the dry binder comprises particles of about 50 nm to about 10 μm in size.

12. A dry method of fabricating a dry electrode film of an energy storage device, comprising:
    mixing a dry prelithiating material and a dry conductive carbon additive to form a first dry mixture wherein the dry prelithiating material does not comprise elemental lithium metal;
    mixing the first dry mixture with a dry active material to form a second dry mixture;
    adding a dry fibrillizable binder to the second dry mixture to form a dry electrode film mixture; and
    fibrillizing the dry fibrillizable binder in the dry electrode film mixture;
    wherein the dry method is a dry fabrication process substantially free of solvents
    wherein the dry electrode film is free-standing, and
    wherein the dry prelithiating material comprises about 0.5-10 wt. % of the dry electrode film.

13. The dry method of claim 12, further comprising calendering the dry electrode film mixture to form the free-standing dry electrode film.

14. The dry method of claim 13, further comprising disposing the free-standing dry electrode film over a current collector to form an electrode.

15. The dry method of claim 14, further comprising:
    incorporating the electrode into an energy storage device; and
    performing an initial cycling of the energy storage device, thereby oxidizing the dry prelithiating material.

16. The dry method of claim 12, wherein mixing the first dry mixture with the dry active material further comprises mixing a dry carbon material and a dry conductive carbon material to form the second dry mixture.

17. The dry method of claim 12, wherein mixing the dry prelithiating material and the dry conductive carbon additive is performed so that a temperature of the first dry mixture is at most about 150° C.

18. The dry method of claim 12, wherein mixing the dry prelithiating material and the dry conductive carbon additive is performed so that the temperature of the first dry mixture is at most about 100° C.

19. The dry method of claim 12, wherein mixing the dry prelithiating material and the dry conductive carbon additive results in electrical contact between primary particles of the dry prelithiating material and the dry conductive carbon additive.

20. The dry method of claim 12, wherein mixing the dry prelithiating material and the dry conductive carbon additive is performed such that a temperature of the first dry mixture is at most about 200° C.

21. The dry method of claim 12, wherein a ratio of the dry prelithiating material and the dry conductive carbon additive is within a range of about 10:1 to about 1:1.

22. The dry method of claim 12, wherein a ratio of the dry prelithiating material and the dry conductive carbon additive is within a range of about 5:1 to about 5:3.

23. The dry method of claim 12, wherein mixing the first dry mixture and the dry active material is performed so that the temperature of the second dry mixture is at most about 100° C.

* * * * *

UNITED STATES PATENT AND TRADEMARK OFFICE
CERTIFICATE OF CORRECTION

PATENT NO. : 11,949,089 B2
APPLICATION NO. : 16/742021
DATED : April 2, 2024
INVENTOR(S) : Ziying Wang et al.

It is certified that error appears in the above-identified patent and that said Letters Patent is hereby corrected as shown below:

On the Title Page

Page 2, Column 1 (item (56) Other Publications), Line 1, delete "sulfer" and insert -- sulfur --.

In the Specification

Column 6, Line 14-15, delete "(trifluoromethansulfonyl)" and insert -- (trifluoromethanesulfonyl) --.

Column 6, Line 15-16, delete "trifluoromethansulfonate" and insert -- trifluoromethanesulfonate --.

Column 7, Line 23, delete "LiNi$_{0.8}$C$_{0.15}$Al$_{0.05}$O$_2$" and insert -- LiNi$_{0.8}$Co$_{0.15}$Al$_{0.05}$O$_2$ --.

In the Claims

Column 20, Line 18 (approx.), Claim 12, delete "solvents" and insert -- solvents, --.

Column 20, Line 42 (approx.), Claim 18, delete "the" and insert -- a --.

Column 20, Line 61 (approx.), Claim 23, delete "the" and insert -- a --.

Signed and Sealed this
Eleventh Day of June, 2024

Katherine Kelly Vidal
*Director of the United States Patent and Trademark Office*